United States Patent
Pnueli et al.

(10) Patent No.: US 7,634,188 B2
(45) Date of Patent: Dec. 15, 2009

(54) METHOD AND APPARATUS FOR CALCULATING A FOCUS METRIC

(75) Inventors: Ayelet Pnueli, Haifa (IL); Mani Fischer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 373 days.

(21) Appl. No.: 11/699,445

(22) Filed: Jan. 29, 2007

(65) Prior Publication Data

US 2008/0181595 A1   Jul. 31, 2008

(51) Int. Cl.
*G03B 3/00* (2006.01)
*G03B 13/00* (2006.01)
*G02B 15/14* (2006.01)
*H04N 5/232* (2006.01)

(52) U.S. Cl. ............... 396/125; 396/79; 396/93; 396/102; 359/698; 348/349; 250/201.8

(58) Field of Classification Search ............ 396/125, 396/79, 80, 82, 93, 102–104; 359/319, 684, 359/693, 698, 705; 348/345, 349, 353–356; 250/201.8
See application file for complete search history.

(56) References Cited

U.S. PATENT DOCUMENTS

| | | | |
|---|---|---|---|
| 5,932,872 A * | 8/1999 | Price | 250/201.3 |
| 6,580,062 B2 | 6/2003 | Baer | |
| 7,016,604 B2 | 3/2006 | Stavely et al. | |
| 2003/0075668 A1 | 4/2003 | Nagasawa | |
| 2006/0062484 A1 | 3/2006 | Aas et al. | |

FOREIGN PATENT DOCUMENTS

EP   0 122 406   10/1984

OTHER PUBLICATIONS

Erasmus, S. J. et al., "An Automatic Focusing and Astigmatism Correction System for SEM and CTEM", Journal of Microscopy vol. 127, p. 185-199, Aug. 1982.
Vollath, D., "The Influence of the Scene Parameters and of Noise on the Behaviour of Automatic Focusing Algorithms", Journal of Microscopy vol. 151, p. 133-146, Aug. 1988.

* cited by examiner

*Primary Examiner*—Rochelle-Ann J Blackman

(57) ABSTRACT

A method comprises receiving a focusing image and shifting the focusing image to obtain a shifted focusing image. In the method, a focus metric of the focusing image is calculated from the focusing image and the shifted focusing image, where the focus metric is configured for use as a factor in making an automatic focus adjustment determination. An automatic focusing apparatus includes a controller configured to implement the method.

18 Claims, 2 Drawing Sheets

METHOD AND APPARATUS FOR CALCULATING A FOCUS METRIC

BACKGROUND

Most modern cameras provide some mechanism for automatic focus adjustment. The automatic focus adjustment mechanism typically includes an electronic controller and a motorized lens assembly. The electronic controller typically implements an algorithm that compares a plurality of focusing images provided at multiple positions of focus. The multiple positions of focus are obtained by stepping the motorized lens assembly through a plurality of lens focus positions, thereby changing the focus point for each of the focusing images.

A calculation is performed on a region of each of the focusing images to provide a figure of merit (FOM), which represents in some way, the closeness of the focusing images to the correct focusing position. There are a number of different FOMs used for different applications. In one example, the FOM calculation includes an edge detection algorithm across the region and a summation of all of the resulting values. Typically, the image representing the lens focus position which provides the maximum value (for instance, the sum of the edge detections), is treated as the optimized focus point for obtaining an image.

In another example, the spatial variance of the image serves as the FOM. When the lens is out of focus, the blur operates like a spatial low-pass filter, decreasing the variance. The spatial variance is therefore maximized when the lens is in focus. The spatial variance FOM depends on the scene illumination level, as well as the scene content and lens focus setting. The variation of the FOM with illumination intensity can cause the focus control algorithm to fail if the illumination level changes with time, as in the case of fluorescent lights. Typically, if the focus control algorithm is presented with a focus FOM change caused by an illumination variation, the focus control algorithm will interpret it as an error in focus position and will make an erroneous correction to the focal position.

The conventional FOMs implemented by focus control algorithms perform relatively well under ideal conditions, such as, when the focusing images contain relatively large objects, when there is little or no noise, and when the focusing images are captured at constant illumination. However, ideal conditions are often not encountered and thus, focus control algorithms that employ the conventional FOMs are typically negatively biased by these conditions, which often leads to less than optimized focus positions for obtaining images. For instance, in order to minimize the time required to perform an automatic focusing operation, focusing images are obtained over a relatively short period of time thereby causing focusing images to typically contain a relatively large amount of noise. Noise, therefore, plays a crucial role in determining conventional figures of merit.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a method and apparatus for calculating a focus metric of a focusing image. The focusing image may generally comprise an image captured at a particular lens focus position that an imaging device, such as, a camera, may use in performing automatic focusing operations. The focus metric is configured to perform well for most types of images, from images containing detailed textures to images containing large, separated, objects, as well as from images having low contrast to images having high contrast. The focus metric is also configured to perform well in various illumination conditions, from low to high noise levels, as well as from steady to fluctuating illumination conditions. The focus metric is further configured to be relatively sensitive, thereby enabling information to be determined even in situations where the focusing image is relatively far away from focus. The focus metric is further configured to be relatively insensitive to hardware changes, and thus does not require fine tuning whenever the hardware is changed.

According to an example, an "unbiased" focus metric of a focusing image may be calculated from the focusing image and a shifted version of the focusing image. The term "unbiased" generally refers to the property that the expectation value of the calculated focus metric is independent of the noise level and the illumination conditions.

Figure 1:
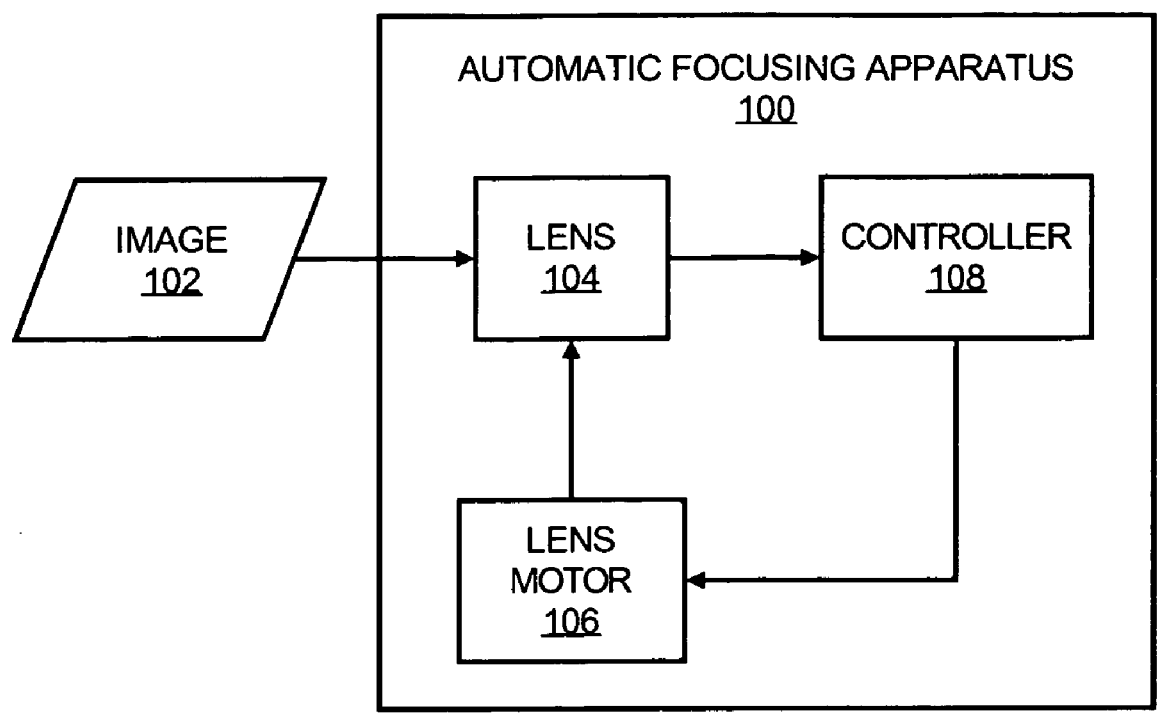
FIG. 1 shows a block diagram of an automatic focusing apparatus configured to implement various embodiments, according to an embodiment of the invention.

With respect to FIG. 1, there is shown a block diagram of an automatic focusing apparatus 100 configured to implement various embodiments of the invention, according to an example. It should be understood that the following description of the automatic focusing apparatus 100 is but one manner of a variety of different manners in which the automatic focusing apparatus 100 may be configured. In addition, it should be understood that the automatic focusing apparatus 100 may include additional components and that some of the components described herein may be removed and/or modified without departing from a scope of the automatic focusing apparatus 100.

The automatic focusing apparatus 100 may comprise a standalone apparatus or it may be configured for use in another component, such as, an imaging device. Suitable types of imaging devices may include, for instance, digital cameras, analog cameras, video recorders, telescopes, microscopes, or other type of imaging device configured to perform automatic focusing operations.

As shown in FIG. 1, the automatic focusing apparatus 100 is configured to receive an image 102 through a lens 104. Although the lens 104 has been depicted as a single lens, the lens 104 may refer to multiple lenses. In addition, the lens 104 may be manipulated to vary the focal point of the lens 104 through operation of a lens motor 106.

A controller 108 may receive the image 102 from the lens 104. The image 102 may comprise a focusing image that the controller 108 may employ in operating the lens motor 106 to vary the focal point of the lens 104. As described in greater detail herein below with respect to FIG. 2, the controller 108 may process the image 102 to determine a focus metric of the image 102. The focus metric of the image 102 may be defined as a figure of merit or other value that may be used to score the focusing image according to its proximity to a true focus. The focus metric may therefore be configured for use as a factor in making an automatic focus adjustment determination.

The controller 108 may comprise a computing device, for instance, a microprocessor, a micro-controller, an application specific integrated circuit (ASIC), or the like, configured to perform various processing functions. In addition, or alternatively, the controller 108 may comprise software operating in any of a number of computing devices.

In any regard, the controller 108 may implement one or more of software or other algorithms stored on a storage device (not shown). The storage device may comprise, for instance, volatile or non-volatile memory, such as DRAM, EEPROM, MRAM, flash memory, and the like. In addition, or alternatively, the one or more of software or other algorithm may be stored on a removable media, such as, a floppy disk, a CD-ROM, a DVD-ROM, or other optical or magnetic media. The one or more of software or other algorithm may be located remotely and the controller 108 may access and implement the one or more of software or other algorithm over a network, such as, an intranet, the Internet, etc.

Figure 2A:
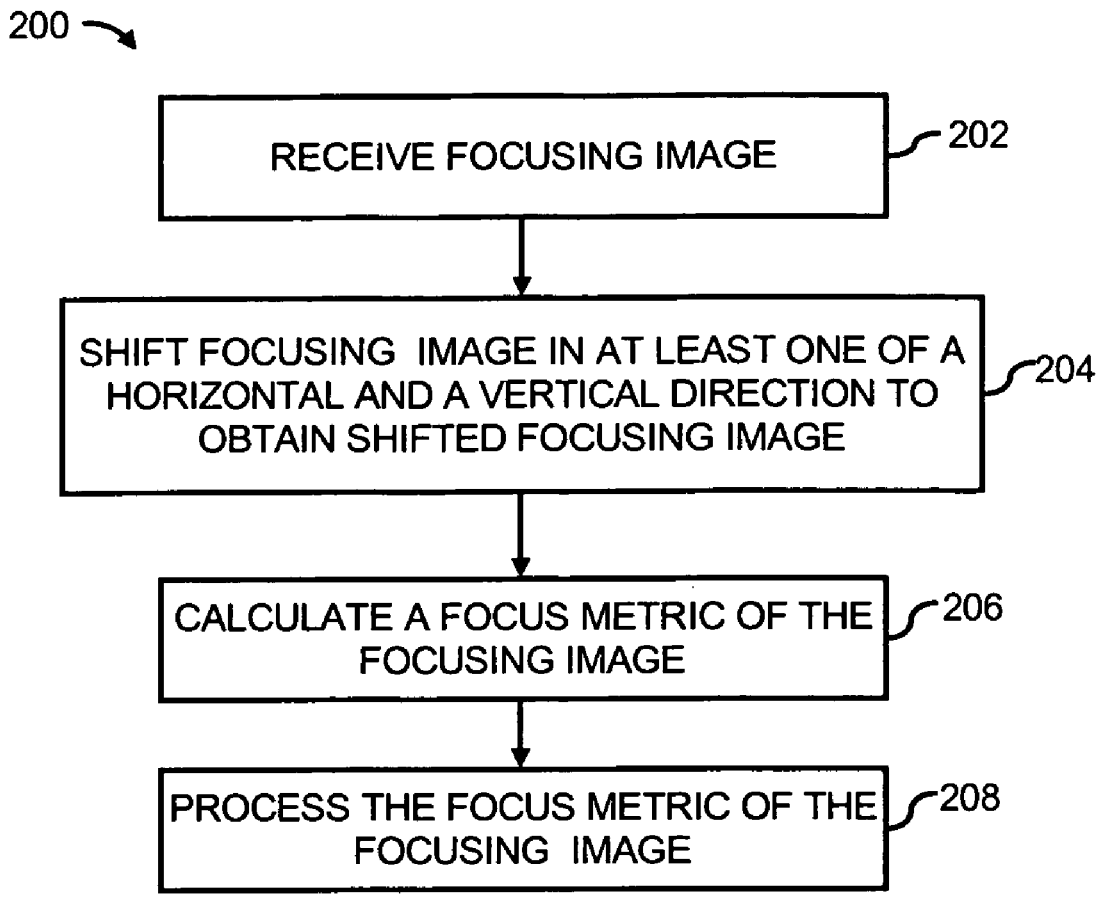
FIG. 2A shows a flow diagram of a method for calculating a focus metric of an image, according to an embodiment of the invention.

Some of the operations performed by the controller 108 are depicted and described with respect to FIG. 2A. FIG. 2A, more particularly, shows a flow diagram of a method 200 for calculating a focus metric of an image, according to an example. It should be apparent to those of ordinary skill in the art that the method 200 represents a generalized illustration and that other steps may be added or existing steps may be removed, modified or rearranged without departing from a scope of the method 200.

The description of the method 200 is made with reference to the automatic focusing apparatus 100 illustrated in FIG. 1, and thus makes reference to the elements cited therein. It should, however, be understood that the method 200 is not limited to the elements set forth in the automatic focusing apparatus 100. Instead, it should be understood that the method 200 may be practiced by a focusing apparatus having a different configuration than that set forth in FIG. 1.

At step 202, the controller 108 may receive a focusing image, which the controller 108 may process in making automatic focus adjustment determinations. At step 204, the controller 108 may shift the focusing image to obtain a shifted focusing image. More particularly, for instance, the controller 108 may shift the focusing image by at least one pixel in at least one of a horizontal and a vertical direction to develop the shifted focusing image. In another example, the controller 108 may shift the focusing image in both the horizontal and the vertical directions to obtain the shifted focusing image. In a further example, the controller 108 may shift the focusing image one pixel distance in the horizontal direction and one pixel distance in the vertical direction to obtain the shifted focusing image.

Although step 204 recites that the focusing image is shifted, it should be understood that the shifting may be performed in an purely computational manner. As such, for instance, a pixel (n+1) in the shifted focusing image may be considered as a shifted version of the pixel (n) in the focusing image. Step 204 should therefore not be construed as requiring that a separate focusing image be developed.

In any regard, at step 206, the controller 108 may calculate a focus metric of the focusing image from both the focusing image and the shifted focusing image. The focus metric of the focusing image may denote a figure of merit or other value that may be used to score the focusing image based upon its proximity to a true focus.

As described above with respect to step 204, the shifted focusing image is shifted by a relatively short distance with respect to the focusing image, on the order of one or more pixels. As such, the shifted focusing image and the focusing image are extremely similar. Because of the similarities between the shifted focusing image and the focusing image, the expectation value of the focus metric for the focusing image is not dependent upon the noise contained in the focusing image, as described in greater detail hereinbelow.

At step 208, the controller 108 may optionally process the focus metric of the focusing image. Step 208 may be considered as an optional step because the method 200 may end, in many instances, after the focus metric of the focusing image has been calculated. However, in instances where the controller 108 is configured to process the focus metric of the focusing image, the controller 108 may be configured to store the focus metric. In addition, or alternatively, the controller 108 may process the focus metric to determine, for instance, whether an optimal lens focus position has been reached.

In determining whether the lens 104 is in an optimal focus position, the controller 108 may implement any reasonably suitable algorithm for maximizing figures of merit. By way of example, the controller 108 may compare the calculated focus metrics of a plurality of focusing images obtained at different lens 104 focus positions to determine which of the lens 104 focus positions yields the highest focus metric value, and may consider that lens 104 focus position as the optimal lens 104 focus position.

Figure 2B:
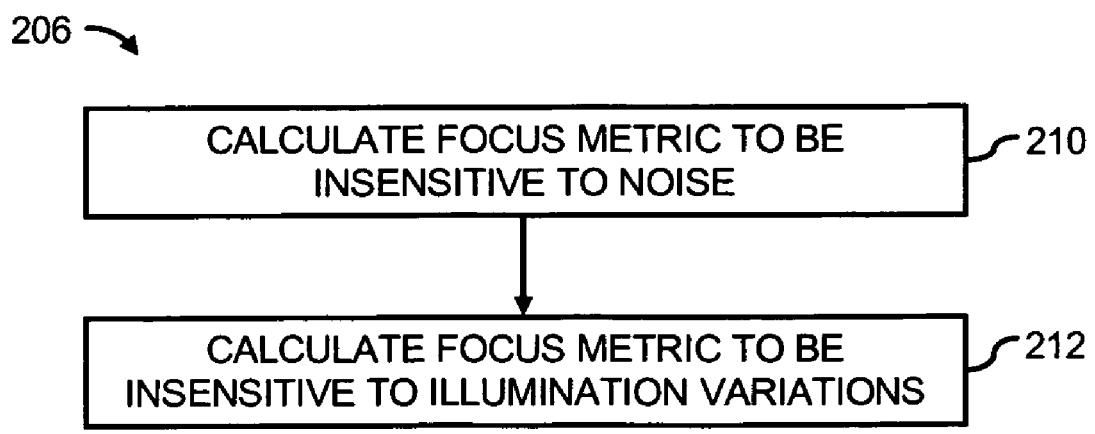
FIG. 2B shows a more detailed illustration of a step of calculating a focus metric depicted in FIG. 2A, according to an embodiment of the invention.

With reference now to FIG. 2B, there is shown a more detailed illustration of step 206 in FIG. 2A, according to an example. As shown in FIG. 2B, at step 210, the controller 108 may calculate the focus metric of the focusing image to be insensitive to noise, which may originate from the electronics of the image capturing device, relatively low lighting, refracting light conditions, etc. In addition, at step 212, the controller 108 may calculate the focus metric of the focusing image to be insensitive to illumination variations, as may occur, for instance, under fluorescent lights. As such, the controller 108 may calculate the focus metric to be relatively unbiased by both the existence of noise and illumination variations in the focusing image.

Although the focusing image and the shifted focusing image obtained at step 204 are not identical, they are assumed to be the same or nearly the same. In addition, because the pixels in each of these images differ due to the relative shifting, the noise contained in the focusing image is uncorrelated with the noise contained in the shifted focusing image. Thus, following step 204, the controller 108 processes two images that are of the nearly identical scene, but having uncorrelated noise. As discussed with respect to step 210, the noise contained in the focusing image is therefore not factored in calculating the focus metric.

At step 210, the controller 108 may calculate the focus metric to be insensitive to noise by multiplying the gradient of the focusing image in the x direction with its neighbor, also in the x direction, and by multiplying the gradient of the focusing image in the y direction with its neighbor, also in the y direction. In other words, the controller 108 may multiply, for instance, the gradient of the focusing image with the gradient of the shifted focusing image developed at step 204. Because the focusing image and the shifted focusing image are nearly identical, the signals of the focusing image and the shifted focusing image are also nearly the same, but the noise associated with the focusing image differs from the noise associated with the shifted focusing image.

This principle is similar to the principles developed with respect to scanning electron microscopes (SEMs), where it is possible to capture a pair of images of an identical scene at each focus setting, and to calculate the covariance between them, rather than the variance of one image. Because the noise in the first image is uncorrelated with the noise in the second image, the expectation value of the covariance is noise independent, unlike that of the variance of one image, which equals the variance of an ideal image plus the variance of the noise. As such, the expectation value of the figure of merit in SEMs that employ this technique represents the signal variance alone. See, for instance, S. J. Erasmus and K. C. A. Smith, *An Automatic Focusing and Astigmatism Correction System for the SEM and CTEM, Journal of Microscopy*, pp. 127, 185-189 (1982), the disclosure of which is hereby incorporated by reference in its entirety. In general, for every metric, an unbiased version may be developed by replacing quadratic elements, which are also quadratic in noise, by multiplication of two elements with uncorrelated noise, such as two different images of the same scene.

At step 212, the controller 108 may calculate the focus metric of the focusing image to be insensitive to illumination variations by dividing the sum of the gradients discussed above with respect to step 210 by the squared average of the gray levels of the pixels in the focusing image. In one respect, this division provides suitable compensation for illumination changes during a focus sequence, for instance, by normalizing the luminance fluctuations.

By way of example, and in keeping with steps 210 and 212, the focus metric may be defined as the sum of the unbiased square gradient of a normalized focusing image. In addition, or alternatively, the focus metric (FM) of a focusing image having M rows and N columns may be calculated through the following equation:

$$FM = \frac{\sum_i \sum_j Gy_{i,j} \cdot Gy_{i+m1,j+k1} + \sum_i \sum_j Gx_{i,j} \cdot Gx_{i+m2,j+k2}}{\bar{f}^2}.$$

Equation (1):

wherein Gx and Gy represent images that are functions of the focusing image (where one of which may be zero), m1, m2, k1 and k2 are shifts that make the products of Gx and Gy unbiased, and $\bar{f}$ represents the average gray value of the focusing image. The summation is performed over the common parts of the two images.

In Equation (1), Gx and Gy may represent gradient images, which are functions of the focusing image. m1, m2, k1 and k2 are shifts, such that the noise of the image (i,j) is uncorrelated with the noise of image(i+mj+k). $\bar{f}$ represent the average gray value of the focusing image. For example:

$$Gx = c_x * f, \text{ and} \qquad \text{Equation (2)}$$

$$Gy = c_y * f. \qquad \text{Equation (3)}$$

In Equations (2) and (3), $c_x$ and $c_y$ are convolution kernels and f denotes the gray value of the focusing image.

Although Equation (1) may employ many different types of operators, examples of suitable operators include an "unbiased gradient square" operator and an "unbiased Sobel square" operator. The "unbiased gradient square" operator employs the convolution kernels:

$$c_x = (-1 \ 0 \ 1), c_y = c_x^T. \ m1 = m2 = 0, k1 = k2 = 1 \qquad \text{Equation (4)}$$

The unbiased Sobel square operator employs the convolution kernels:

$$c_x = \frac{1}{4}\begin{pmatrix} -1 & 0 & 1 \\ -2 & 0 & 2 \\ -1 & 0 & 1 \end{pmatrix},$$

Equation (5):

$$c_y = c_x^T. \ m1 = m2 = 0, k1 = k2 = 1$$

Another example is the unbiased version of the variance, in which either Gx or Gy from Equation (1) is zero, and the remainder is denoted with the letter G. In this case, the focus metric (FM) may be calculated through the following equation:

$$FM = \frac{\sum_{i=1}^{M} \sum_{j=1}^{N-1} G_{i,j} \cdot G_{i,j+1}}{\bar{f}^2}.$$

Equation (6):

Where $G = f - \bar{f}$.

In general, every existing focus metric may be replaced by an unbiased version by replacing quadratic elements by multiplication of two elements with the same, or very similar, signal but with uncorrelated noise.

Through implementation of the method 200, the proximity of a focusing image to an optimal focus position may be determined in a relatively fast and efficient manner. For instance, the method 200 enables the determination of a focus metric that has a decreased level of sensitivity to noise in the focusing image as compared with conventional figures of merit, which removes the requirement of a de-noising step, as is typically required with conventional automatic focusing algorithms.

The operations set forth in the method 200 may be contained as a utility, program, or subprogram, in any desired computer accessible medium. In addition, the method 200 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method comprising:
    receiving a focusing image;
    shifting the focusing image along a direction parallel to a plane along which the focusing image extends to obtain a shifted focusing image; and
    calculating a focus metric (FM) of the focusing image from the focusing image having M rows and N columns according to:

$$FM = \frac{\sum_i \sum_j Gy_{i,j} \cdot Gy_{i+m1,j+k1} + \sum_i \sum_j Gx_{i,j} \cdot Gx_{i+m2,j+k2}}{\bar{f}^2},$$

wherein Gx and Gy represent images that are linear functions of the focusing image, both in signal and noise, and m1, m2, k1 and k2 are shifts of the images selected to make the products of Gx and Gy not contain elements of the form $N_{ij}^2$, where $N_{ij}$ is the noise in the ij'th pixel in the image, and $\bar{f}$ represents a normalizing scalar.

2. The method according to claim 1, wherein shifting the focusing image further comprises shifting the focusing image at least one pixel distance in at least one of a horizontal and a vertical direction to obtain the shifted focusing image.

3. The method according to claim 1, wherein calculating the focus metric further comprises calculating the focus metric to be insensitive to at noise in the focusing image by:
    selecting Gx and Gy to be images obtained by gradient functions of the focusing image; and
    selecting at least one of the shifts m1, m2, k1 and k2 to be greater than or equal to 1 pixel.

4. The method according to claim 1, wherein calculating the focus metric of the focusing image further comprises calculating the focus metric to be insensitive to the noise in the focusing image by:
    selecting Gx to be zero;
    selecting Gy to be the focusing image by selecting the identity function; and
    selecting at least of the shifts m1, m2, k1 and k2 to be greater than or equal to 1 pixel.

5. The method according to claim 1, wherein calculating the focus metric further comprises calculating the focus metric to be insensitive to illumination variations by selecting $\bar{f}$ to be the average gray level value of the focusing image.

6. The method according to claim 1, wherein calculating the focus metric further comprises:
    normalizing the gray levels of the pixels in the focusing image; and
    summing an unbiased square gradient of the normalized focusing image.

7. The method according to claim 1, wherein calculating the focus metric further comprises calculating the focus metric with Gx=0 and Gy=f−$\bar{f}$.

8. The method according to claim 1, wherein i+m1, i+m2, j+k1 and j+k2 represent pixels in the shifted focusing image.

9. The method according to claim 8, wherein calculating the focus metric further comprises calculating the focus metric with Gx and Gy defined as:

$Gx = c_x * f$, and $Gy = c_y * f$, wherein $c_x$ and $c_y$ are convolution kernels and f denotes the gray value of the focusing image.

10. The method according to claim 1, further comprising:
    processing the focus metric to determine whether the focusing image results from an optimal lens focus position.

11. An automatic focusing apparatus comprising:
    a lens having a focal point;
    a lens motor configured to manipulate the lens to vary the focal point of the lens;
    a controller configured to automatically control the lens motor to focus the lens, said controller being further configured to shift a focusing image along a direction parallel to a plane along which the focusing image extends to obtain a shifted focusing image, to calculate a focus metric (FM) of the focusing image having M rows and N columns according to:

$$FM = \frac{\sum_i \sum_j Gy_{i,j} \cdot Gy_{i+m1,j+k1} + \sum_i \sum_j Gx_{i,j} \cdot Gx_{i+m2,j+k2}}{\bar{f}^2},$$

wherein Gx and Gy represent images that are linear functions of the focusing image, both in signal and noise, and m1, m2, k1 and k2 are shifts of the images selected to make the products of Gx and Gy not contain elements of the form $N_{ij}^2$, where $N_{ij}$ is the noise in the ij'th pixel in the image, and $\bar{f}$ represents a normalizing scalar, and to use the focus metric as a factor in making an automatic focus adjustment determination.

12. The automatic focusing apparatus according to claim 11, wherein the controller is further configured to shift the focusing image one pixel distance in at least one of a horizontal and a vertical direction to obtain the shifted focusing image.

13. The automatic focusing apparatus according to claim 11, wherein the controller is further configured to calculate the focus metric to be insensitive to the noise in the focusing image by:
    selecting Gx and Gy to be images obtained by gradient functions of the focusing image; and
    selecting at least one of the shifts m1, m2, k1 and k2 to be greater than or equal to 1 pixel.

14. The automatic focusing apparatus according to claim 11, wherein the controller is further configured to calculate the focus metric to be insensitive to noise in the focusing image by:
    selecting Gx to be zero;
    selecting Gy to be the focusing image by selecting the identity function; and
    selecting at least of the shifts m1, m2, k1 and k2 to be greater than or equal to 1 pixel.

15. The automatic focusing apparatus according to claim 11, wherein the controller is further configured-to calculate the focus metric to be insensitive to illumination variations by selecting $\bar{f}$ to be the average gray level value of the focusing image.

16. The automatic focusing apparatus according to claim 11, wherein the controller is further configured to normalize the gray levels of the pixels in the focusing image and to sum an unbiased square gradient of the normalized focusing image to calculate the focus metric.

17. A computer readable storage medium on which is embedded one or more computer programs, said one or more computer programs implementing a method for calculating a focus metric of a focusing image, said one or more computer programs comprising computer readable code for:
    shifting the focusing image along a direction parallel to a plane along which the focusing image extends to obtain a shifted focusing image; and calculating a focus metric (FM) of the focusing image having M rows and N columns according to:

$$FM = \frac{\sum_i \sum_j Gy_{i,j} \cdot Gy_{i+m1,j+k1} + \sum_i \sum_j Gx_{i,j} \cdot Gx_{i+m2,j+k2}}{\bar{f}^2},$$

wherein Gx and Gy represent images that are linear functions of the focusing image, both in signal and noise, and m1, m2, k1 and k2 are shifts of the images selected to make the products of Gx and Gy not contain elements of the form $N_{ij}^2$, where $N_{ij}$ is the noise in the ij'th pixel in the image, and $\bar{f}$ represents a normalizing scalar.

18. The computer readable storage medium according to claim 17, said one or more computer programs further comprising computer readable code for:

calculating the focus metric of the focusing image to be insensitive to noise and to illumination variations.

* * * * *

UNITED STATES PATENT AND TRADEMARK OFFICE
CERTIFICATE OF CORRECTION

PATENT NO. : 7,634,188 B2 Page 1 of 1
APPLICATION NO. : 11/699445
DATED : December 15, 2009
INVENTOR(S) : Ayelet Pnueli et al.

It is certified that error appears in the above-identified patent and that said Letters Patent is hereby corrected as shown below:

In column 6, lines 65-66, in Claim 1, after "image" delete "from the focusing image".

In column 7, line 19, in Claim 3, after "metric" insert -- of the focusing image --.

In column 7, line 20, in Claim 3, delete "at" and insert -- the --, therefor.

In column 7, line 32, in Claim 4, after "least" insert -- one --.

In column 7, line 55, in Claim 9, delete "$c_y$," and insert -- $c_y$ --, therefor.

In column 8, line 46, in Claim 14, after "least" insert -- one --.

In column 8, line 50, in Claim 15, delete "configured-to" and insert -- configured to --, therefor.

In column 10, line 6, in Claim 18, before "said" insert -- wherein --.

Signed and Sealed this

Fourth Day of May, 2010

David J. Kappos
*Director of the United States Patent and Trademark Office*